United States Patent [19]

Rifi

[11] Patent Number: 4,493,924

[45] Date of Patent: Jan. 15, 1985

[54] WATER-CURABLE, SILANE MODIFIED CHLOROSULFONATED OLEFINIC POLYMERS AND A PROCESS FOR THE PREPARATION THEREOF

[75] Inventor: Mahmoud R. Rifi, Kendall Park, N.J.

[73] Assignee: Union Carbide Corporation, Danbury, Conn.

[21] Appl. No.: 501,301

[22] Filed: Jun. 10, 1983

[51] Int. Cl.$^3$ ............................ C08F 8/00; C08F 8/38
[52] U.S. Cl. .................... 525/102; 525/104; 525/106
[58] Field of Search .................. 525/102, 104, 106

[56] References Cited

U.S. PATENT DOCUMENTS

| | | | |
|---|---|---|---|
| 3,366,612 | 1/1968 | Baldwin et al. | 525/342 |
| 3,398,045 | 8/1968 | Clayton et al. | 525/106 |
| 3,408,420 | 10/1968 | Wiggill | 525/106 |
| 3,441,545 | 4/1969 | Blatz et al. | 525/340 |
| 3,646,155 | 2/1972 | Scott | 525/288 |
| 4,291,136 | 9/1981 | Keogh | 525/102 |
| 4,328,323 | 5/1982 | Keogh | 525/106 |
| 4,343,917 | 8/1982 | Keogh | 525/106 |

FOREIGN PATENT DOCUMENTS

| | | | |
|---|---|---|---|
| 1243677 | 7/1967 | Fed. Rep. of Germany . | |
| 167739 | 12/1981 | Japan | 525/102 |
| 8203 | 1/1982 | Japan | 525/102 |
| 28107 | 2/1982 | Japan | 525/106 |
| 96049 | 6/1982 | Japan | 525/102 |

OTHER PUBLICATIONS

Canadian J. of Chem. 34 758, (1956).

*Primary Examiner*—Wilbert J. Briggs, Sr.
*Attorney, Agent, or Firm*—James C. Arvantes; Robert C. Brown

[57] ABSTRACT

Water-curable, silane modified chlorosulfonated olefinic polymers, particularly desirable for use as coverings about wires and cables, produced by reacting a mixture containing a chlorosulfonated olefinic polymer and a hydrolyzable silane having cyclic oxygen, sulfur or nitrogen functionality.

34 Claims, No Drawings

WATER-CURABLE, SILANE MODIFIED CHLOROSULFONATED OLEFINIC POLYMERS AND A PROCESS FOR THE PREPARATION THEREOF

SUMMARY OF THE INVENTION

This invention is directed to water-curable, silane modified chlorosulfonated olefinic polymers and to a process for the preparation thereof by reacting a chlorosulfonated olefinic polymer with a hydrolyzable silane having cyclic oxygen, sulfur or nitrogen functionality. The silane modified chlorosulfonated olefinic polymers of this invention can be water-cured, in a relatively short period of time, to crosslinked products characterized by a number of desirable properties including flexibility, resistance to chemical solvents, ozone and abrasion and also resistance to outdoor weathering.

BACKGROUND OF THE INVENTION

Compositions, based on chlorosulfonated olefinic polymers, are commercially attractive systems, as once cured to crosslinked products, are characterized by a number of desirable properties, including (a) resistance to chemical solvents (b) resistance to ozone (c) resistance to abrasion (d) resistance to outdoor weather and (e) use temperatures, i.e. flexibility over a temperature range of about $-20°$ C. to about $120°$ C. Consequently, cured chlorosulfonated olefinic polymers and compositions based thereon, characterized by the properties described above, find uses in many diverse applications including coverings about wires and cables, hoses for conveying chemicals, gaskets which are exposed to solvents and roofing materials.

As a general rule, curing of chlorosulfonated olefinic polymers has been effected by admixing these polymers with curing agents such as metal oxides, exemplified by magnesium oxide and lead oxide, or polyfunctional alcohols, exemplified by ethylene glycol and pentaerythritol, and subjecting the resultant compositions to elevated temperatures, on the order of about $150°$ C., for periods of time of about 30 minutes. At the elevated temperatures involved, it has been found that such compositions tend to prematurely crosslink, commonly referred to as "scorching". In such instances, the processing, for example, extrusion, of the compositions has to be stopped and the prematurely crosslinked products removed from the system. Interruption of the process is costly and adds to the overall cost of the finished product.

DETAILED DESCRIPTION OF THE INVENTION

The present invention provides for water-curable, silane modified chlorosulfonated olefinic polymers, produced by reacting a mixture containing a chlorosulfonated olefinic polymer and a hydrolyzable silane having cyclic oxygen, cyclic sulfur or cyclic nitrogen functionality.

The water-curable, silane modified chloro-sulfonated olefinic polymers of this invention can be cured by moisture in a relatively short period of time, to crosslinked products free of undesirable scorch. The crosslinked products so produced are characterized by the properties previously discussed in reference to chlorosulfonated olefinic polymers and find utility in applications also previously discussed.

The reaction between a chlorosulfonated olefinic polymer and a silane having cyclic oxygen, sulfur or nitrogen functionality can be depicted as follows:

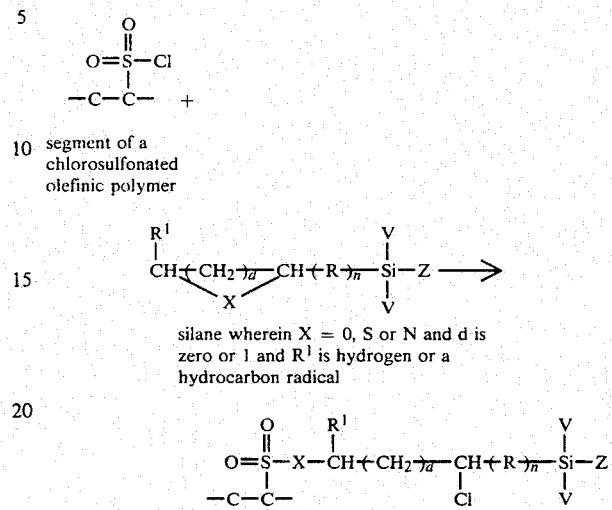

As can be seen, no undesirable byproducts, such as HCl which could cause scorching, ae formed.

Illustrative of suitable silanes, for purposes of this invention, have the general formula:

Formula I wherein X is oxygen, sulfur or nitrogen; R is a hydrocarbon radical or oxy substituted hydrocarbon radical; each V, which can be the same or different, is hydrogen, a hydrocarbon radical or a hydrolyzable group; Z is a hydrolyzable group; n is an integer having a value of one to 18 inclusive; d is an integer having a value of zero or 1, and $R^1$ is hydrogen or a hydrocarbon radical.

Exemplary of suitable radicals for R are alkylene radicals having one to 18 carbon atoms inclusive, preferably one to 6 carbon atoms inclusive, such as methylene, ethylene, propylene, butylene, hexylene and the like; alkoxy radicals having one to 18 carbon atoms inclusive, preferably one to 6 carbon atoms inclusive such as methyloxymethyl, methyloxypropyl, ethyloxyethyl, ethyloxypropyl, propyloxypropyl, propyloxybutyl, propyloxyhexyl and the like. $R^1$ is a hydrocarbon radical, preferably an alkyl radical having a maximum of 4 carbon atoms as specifically identified for V below or phenyl.

As stated, each V can be hydrogen, a hydrocarbon radical or a hydrolyzable group. Illustrative of suitable radicals are alkyl radicals having one to 18 carbon atoms, inclusive, preferably one to 6 carbon atoms inclusive such as methyl, ethyl, n-propyl, isopropyl, n-butyl, n-hexyl and the like; alkoxy radicals having one to 18 carbon atoms inclusive, preferably one to 6 carbon atoms inclusive, such as methoxy, ethoxy, propoxy, hexoxy, dodecyloxy, methoxyethoxy and the like; aryl radicals having 6 to 8 carbon atoms inclusive such as phenyl, methylphenyl, ethylphenyl and the like; cycloaliphatic radicals having 5 to 8 carbon atoms inclusive such as cyclopentyl, cyclohexyl, cyclohexyloxy and the like.

Z, as previously stated, is a hydrolyzable group among which can be noted alkoxy radicals as previously described for V; oxy aryl radicals such as oxyphenyl and the like; halogens such as chlorine and the like.

Among suitable silanes falling within the scope of Formula I are the following:

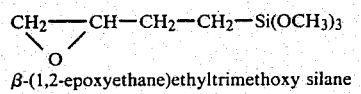

β-(1,2-epoxyethane)ethyltrimethoxy silane

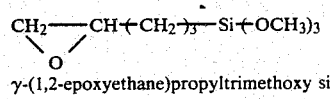

γ-(1,2-epoxyethane)propyltrimethoxy silane

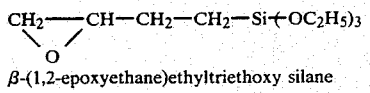

β-(1,2-epoxyethane)ethyltriethoxy silane

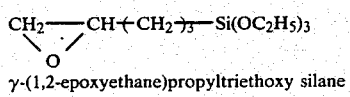

γ-(1,2-epoxyethane)propyltriethoxy silane

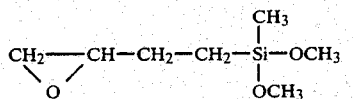

β-(1,2-epoxyethane)ethylmethyldimethoxy silane

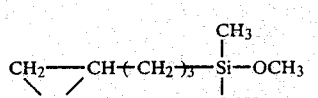

γ-(1,2-epoxyethane)propylmethyldimethoxy silane

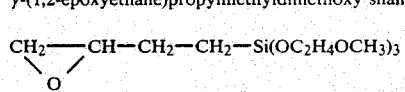

β-(1,2-epoxyethane)ethyl-tris-(ethoxymethoxy) silane

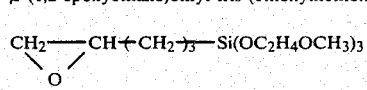

γ-(1,2-epoxyethane)propyl-tris-(ethoxymethoxy) silane

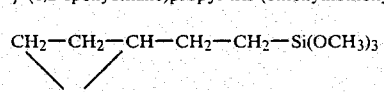

β-(1,2-epoxypropane)ethyltrimethoxy silane; and the sulfur and nitrogen analogues of these specific compounds. Also suitable are compounds such as β-(3,4-epoxycyclohexane)ethyltrimethoxy silane and the like.

Olefinic polymers which are chlorosulfonated and subsequently rendered water-curable, in accordance with the present invention, are normally solid homopolymers and interpolymers generally solids at room temperature of monoolefins and diolefins.

Suitable polymerizable monoolefins have the general formula:

$$C_\alpha H_{2\alpha} \qquad \text{II}$$

wherein α has a value of at least 2. Exemplary of olefins falling within the scope of Formula II are: ethylene, propylene, butene-1, pentene-1, hexene-1, octene-1 and the like.

Suitable polymerizable diolefins have the general formula:

$$C_\beta H_{2\beta-2} \qquad \text{III}$$

wherein β has a value of at least 3. Exemplary of diolefins falling within the scope of Formula III are: propadiene (allene), 1,3-butadiene, 1,4-pentadiene, 2-methyl-1,3-butadiene, 1,5-hexadiene, 1,4-octadiene and the like.

Illustrative of monomers which can be polymerized with monoolefins and/or diolefins are styrene, p-methyl styrene, α-methyl styrene, p-chloro styrene, vinyl naphthalene and similar aryl olefins and substituted aryl olefins, acrylic, substituted acrylic acids, and nitriles such as acrylic acid, acrylonitrile, methacrylonitrile, α-chloroacrylonitrile and the like; vinyl acetate, vinyl methyl ketone, vinyl methyl ether, vinylidene chloride and similar polymerizable compounds containing a single olefinic double bond, provided that the olefinic content is at least about 0.1 percent by weight, preferably 1 to about 50 percent by weight.

Other suitable polymerizable monomers are the alkyl acrylates which fall within the scope of the following formula:

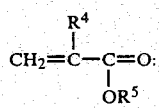

Formula IV wherein $R^4$ is hydrogen or methyl and $R^5$ is alkyl having one to 8 carbon atoms inclusive. Illustrative compounds encompassed by this formula are: methyl acrylate, ethyl acrylate, t-butyl acrylate, methyl methacrylate, n-butyl acrylate, n-butylmethacrylate, 2-ethylhexyl acrylate, chloroethyl acrylate and the like and mixtures thereof.

Particularly desirable polymers are alkylene-alkyl acrylate copolymers generally having a density (ASTM D-1505 with conditioning as in ASTM D 147-72) of about 0.92 to about 0.94 and a melt index (ASTM D-1238 at 44 psi tested pressure) of about 0.1 to about 500 decigrams per minute. These copolymers generally have about one to about 50 percent by weight combined alkyl acrylate, preferably about 2 to about 20 percent by weight combined alkyl acrylate.

It is to be understood that mixtures of olefins falling within the scope of Formula II and/or diolefins falling within the scope of Formula III can be polymerized to produce suitable olefinic polymers.

Preferred polymers are ethylene-propylene copolymers, ethylene-butene copolymers and the like produced under low pressures on the order of about 15 to 300 psi, using a chromium oxide catalyst modified with titanium as disclosed in U.S. Pat. No. 4,011,382 granted Mar. 8, 1977.

Particularly desirable olefinic polymers, which are chlorosulfonated and then reacted with the silanes described, have densities (ASTM D-1505) of about 0.875 to about 0.970, preferably about 0.875 to about 0.930. These olefinic polymers can be prepared by reacting a mixture containing about 50 to about 99.9 mole percent, preferably about 75 to about 96 mole percent ethylene and from about 0.1 to about 50 mole percent and preferably about 4 to about 25 mole percent of one or more $C_3$ to $C_8$ alpha olefins such as propylene, butene-1, pentene-1, 4-methyl-pentene-1, hexene-1, heptene-1, octene-1 and the like.

The chlorosulfonated olefinic polymers are conveniently prepared by reacting the desired olefinic polymer with chlorine and sulfur dioxide in a manner described subsequently in this application or with sulfuryl chloride as described in U.S. Pat. No. 4,145,491 granted Mar. 20, 1979 and generally have a crystallinity of below about 10 percent, as measured by a Differential Scanning Calorimeter (DSC, DuPont-990).

Particularly desirable chlorosulfonated olefinic polymers contain about 5 to about 40 percent by weight chlorine and about 0.5 to about 10 percent by weight sulfur, based on the total weight of the chlorosulfonated olefinic polymer.

The reaction between the chlorosulfonated olefinic polymers and the hydrolyzable silanes proceeds in the absence of a catalyst although an organo titanate catalyst is preferably used.

Suitable organo titanates can be exemplified by titanates falling within the scope of Formula V below.

$$Ti(OR^2)_4 \qquad \qquad V$$

wherein each $R^2$, which can be the same or different, is hydrogen or a hydrocarbon radical having one to 18 carbon atoms inclusive, preferably one to 14 carbon atoms inclusive. By definition, at least one $R^2$ is a hydrocarbon radical.

Exemplary of suitable hydrocarbon radicals are alkyl radicals such as methyl, ethyl, n-propyl, isopropyl, butyl, octyl, lauryl, myristyl, stearyl and the like; cycloaliphatic radicals such as cyclopentyl, cyclohexyl and the like, aryl radicals such as phenyl, methylphenyl, chlorophenyl and the like; alkaryl radicals such as benzyl and the like.

Particularly desirable titanates falling within the scope of Formula V are those wherein each $R^2$ is alkyl having one to 18 carbon atoms inclusive, preferably one to 14 carbon atoms inclusive, exemplified by tetrabutyl titanate, tetraisopropyl titanate and the like.

Organo titanates falling within the scope of Formula V are known compounds and can be conveniently prepared as described in U.S. Pat. No. 2,984,641 to Leon E. Wolinski patented May 16, 1961.

Other suitable organo titanates are the organo titanium chelates such as tetraoctylene glycol titanium, triethanol amine titanate, titanium acetyl acetonate, titanium lactate and the like.

In those instances wherein a catalyst is used, it is used in catalytic amounts, that is, in amounts sufficient to catalyze the reaction between the chlorosulfonated olefinic polymer and the hydrolyzable silane. Generally, this amount is about 0.1 to about 20 percent by weight, preferably about 0.5 to about 10 percent by weight, based on the weight of the chlorosulfonated olefinic polymer.

As shown by the equation previously set forth, the reaction of the silane with the chlorosulfonated olefinic polymer takes place between the sulfonyl chloride group of the polymer and the cyclic moiety of the silane. Consequently, the actual amount of silane used depends on the concentration of the sulfur, which determines the number of sulfonyl chloride groups of the polymer. One cyclic oxygen, sulfur or nitrogen group is deemed to react with one sulfonyl group. The higher the sulfur content of the polymer, the higher is the amount of silane that can be used, which in turn, results in a higher degree of crosslinking. Thus by varying the sulfur content of the polymers and in turn the amount of silane, the "degree" of cure can be varied. This allows for the preparation of a wide variety of products for different end use applications. With sulfur contents on the order of about 0.5 to about 10 percent by weight, the amount of silane used in the reaction mixtures can vary from about 0.1 to about 50 percent by weight, preferably about 0.5 to about 10 percent by weight based on the weight of the chlorosulfonated polymer.

The temperature at which this reaction is carried out is not critical and can vary, conveniently, from about 80° C. to about 300° C. and preferably from about 130° C. to about 230° C.

The reaction can be carried out at atmospheric, subatmospheric or superatmospheric pressure, although atmospheric pressure is preferred.

Recovery of the silane modified polymer is effected by allowing the contents of the reaction apparatus to cool and discharging the product to a suitable receiver for storage, preferably under an inert gas blanket.

The reaction can be carried out in any suitable apparatus, preferably an apparatus in which the polymer is subjected to mechanical working such as a Brabender mixer, a Banbury mixer or an extruder. The silane can be added to the fluxed polymer and catalyst, if desired, then added. Alternatively, the catalyst, if desired, can be added to the polymer prior to the addition of the silane. Also, the catalyst and silane can be premixed and added to the fluxed polymer.

The curing or crosslinking of the silane modified polymer is effected by exposing the polymer to moisture. The moisture present in the atmosphere is usually sufficient to permit curing to occur over a period of 48 hours.

The rate of curing, in a matter of 30 minutes, can be accelerated by exposure to an artificially humidified atmosphere or immersion in water, and heating to elevated temperatures or by exposure to steam.

Generally, curing is effected at temperatures on the order of about 23° C. to about 100° C., preferably about 70° C. to about 100° C.

Additionally, the crosslinking may be carried out in the presence of a silanol condensation catalyst.

A wide variety of materials which function as silanol condensation catalysts and which are known in the art can be employed in the crosslinking process. Such materials include metal carboxylates such as dibutyltin dilaurate, dibutyltin diacetate, dibutyltin dioctoate and the like.

To the silane modified polymers of this invention may be added various additives, in amounts well known in the art, such as fillers among which can be mentioned carbon black, clay, talc, (magnesium silicate), calcium carbonate, silica, aluminum hydroxide and the like.

The silane modified polymers can be rendered flame retardant by the addition thereto of halogen containing flame retardants such as decabromodiphenyl oxide, chlorinated polyethylene, polyvinyl chloride and halogenated paraffin waxes, alone, or in admixture with organic or inorganic antimony compounds such as antimony oxide and/or alkaline earth metal oxides, carbonates, hydroxides and sulfates. Among such alkaline earth metal compounds can be noted calcium oxide, calcium carbonate, calcium hydroxide, calcium sulfate, magnesium oxide, magnesium carbonate, magnesium hydroxide and magnesium sulfate.

These additives are conveniently added to the reacted product of the silane and chlorosulfonated polymer.

It is to be noted that mixtures of reactants, catalysts, additives and the like can be used if so desired.

Test procedures noted in this specification were conducted as follows:

| | |
|---|---|
| Tensile Modulus (one percent secant modulus) psi | A film, 4 inches by 4 inches by 0.020 inch was compression molded at a temperature of 130° C.-150° C. and its modulus measured according to ASTM 638 |
| Tensile Strength (psi) | A film prepared as described for tensile modulus was tested according to ASTM 638 |

As can be seen from the results tabulated in Table 1, compositions of this invention have tensile strengths and tensile modulii well within the range required for commercial applications, as set forth below:

| Properties of Cured (No Additives) Chlorosulfonated Polymers Suitable For Commercial Applications | |
|---|---|
| | 25° C. |
| Tensile Strength (psi) | 600–1300 |
| Tensile Modulus (psi) | 400–1400 |

In the examples which follow, the watercurable, silane modified olefinic polymers were prepared as follows:

Chlorosulfonation

Two hundred grams of a polyethylene having a density of 0.910 were fed into a two-liter, glass lined, stainless steel reactor (Hastelloy), equipped with a thermocouple, thermometer and a motor activated U shaped Hastelloy stirrer. A Hastelloy dip tube, about 2 cm in diameter, was used to feed gaseous chlorine and sulfur dioxide modifying agents into the reactor. Unreacted modifying agents and HCl by product were vented to a collection trap containing 25 percent aqueous NaOH.

After the polymer was heated to the desired temperature, between about 50° C. to 100° C., the polymer was stirred as gaseous chlorine and sulfur dioxide were fed into the reactor. The rate of feed for the chlorine was about 8 to 15 grams per hour. The rate of feed for the sulfur dioxide was 2–4 grams per hour.

During the course of the reaction, samples of the modified polymer were taken from the reactor and tested for crystallinity and sulfur and chlorine content. When the reaction had proceeded to a point at which the crystallinity of the modified polymer had reached less than about 10 percent, the flow of gaseous modifying agents was terminated. The chlorosulfonated polymer was allowed to cool in the reactor while being purged with nitrogen in order to remove HCl and unreacted chlorine and/or sulfur dioxide.

Crystallinity was measured by a Differential Scanning Calorimeter (DSC) using a DuPont-990 analyzer with a pressure DSC cell.

The polymer so produced, containing 26 percent by weight chlorine and 1.1 percent by weight sulfur, was then used in the preparation of water-curable, silane modified polymers as described in the following examples.

EXAMPLE 1

Forty grams of the chlorosulfonated polymer were placed in a Brabender mixer which had been preheated to a temperature of 130° C. The polymer was fluxed for two to five minutes under a nitrogen gas flow and to the fluxed polymer there was added, slowly, 3.2 grams (0.0136 mole) of $\gamma$-(1,2-epoxyethane)propyltrimethoxy silane. The reaction mixture was then fluxed for 30 seconds. The resultant silane modified chlorosulfonated polymer was allowed to cool, under a nitrogen gas flow, to ambient temperature. The cooled polymer was molded into film, in a manner previously described, and the film placed in a water bath for 7 hours. The temperature of the water bath was about 70° C.

The cured film was then used to determine properties tabulated in Table 1.

EXAMPLE 2

Forty grams of the chlorosulfonated polymer were placed in a Brabender mixer which had been preheated to a temperature of 130° C. The polymer was fluxed from two to five minutes under a nitrogen gas flow and to the fluxed polymer there was added, slowly, 3.2 grams of $\gamma$-(1,2-epoxyethane)propyltrimethoxy silane, followed by 4 grams of tetraisopropyl titanate and one drop of dibutyltin dilaurate. The reaction mixture was then fluxed for 30 seconds. The resultant silane modified chlorosulfonated polymer was allowed to cool, under a nitrogen gas flow, to ambient temperature. The cooled polymer was molded into film, in a manner previously described, and the film placed in a water bath for 7 hours. The temperature of the water bath was about 70° C.

The cured film was then used to determine properties tabulated in Table 1.

EXAMPLE 3

This example was carried out as described for Example 2 with the exception that 1.5 grams of $\gamma$-(1,2-epoxyethane)propyltrimethoxy silane and 1.8 grams of tetraisopropyl titanate were used.

Properties of the cured film are tabulated in Table 1.

TABLE 1

| | Example 1 | Example 2 | Example 3 |
|---|---|---|---|
| Tensile Strength (psi) 25° C. | 670 | 1160 | 650 |
| Tensile Modulus (psi) 25° C. | 1030 | 1400 | 850 |

What is claimed is:

1. A composition of matter comprising a chlorosulfonated olefinic polymer and a hydrolyzable silane having a cyclic oxygen, cyclic sulfur or cyclic nitrogen functionality.

2. A composition of matter comprising a chlorosulfonated olefinic polymer, a hydrolyzable silane having cyclic oxygen, cyclic sulfur or cyclic nitrogen functionality and an organo titanate.

3. A composition of matter comprising a chlorosulfonated olefinic polymer, a hydrolyzable silane having the formula:

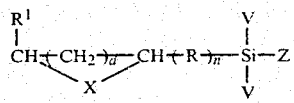

wherein X is oxygen, sulfur or nitrogen, R is a hydrocarbon radical or an oxy substituted hydrocarbon radical, each V is hydrogen, a hydrocarbon radical or a hydrolyzable group, Z is a hydrolyzable group, n is an integer having a value of one to 18, d is an integer having a value of zero or one and $R^1$ is hydrogen or a hydrocarbon radical; and an organo titanate having the formula:

$$Ti(OR^2)_4$$

wherein each $R^2$ is hydrogen or a hydrocarbon radical having one to 18 carbon atoms, provided that at least one $R^2$ is a hydrocarbon radical.

4. A composition of matter as defined in claim 3 wherein X is oxygen, d is zero and $R^1$ is hydrogen.

5. A composition of matter as defined in claim 3 wherein X is sulfur, d is zero and $R^1$ is hydrogen.

6. A composition of matter as defined in claim 3 wherein X is nitrogen, d is zero and $R^1$ is hydrogen.

7. A composition of matter as defined in claim 3 wherein d is zero.

8. A composition of matter as defined in claim 3 wherein $R^1$ is hydrogen.

9. A composition of matter as defined in claim 8 wherein the olefinic polymer is a polymer of ethylene and at least one $C_3$ to $C_8$ alpha olefin.

10. A composition of matter as defined in claim 3 wherein said organo titanate is present in an amount of about 0.1 to about 20 percent by weight and said silane is present in an amount of about 0.1 to about 50 percent by weight, based on the weight of a chlorosulfonated olefinic polymer having a sulfur content of about 0.5 to about 10 percent by weight.

11. A composition of matter as defined in claim 10 wherein said organo titanate is present in an amount of about 0.5 to about 10 percent by weight and said silane is present in an amount of about 0.5 to about 10 percent by weight, based on the weight of said chlorosulfonated olefinic polymer.

12. A composition of matter as defined in claim 3 wherein d is 0, R is alkylene, each V and Z are alkoxy, X is oxygen and $R^1$ is hydrogen.

13. A composition of matter as defined in claim 3 wherein said olefinic polymer is chlorosulfonated polyethylene, said silane is γ-(1,2-epoxyethane)propyltrimethoxy silane and said organo titanate is tetraisopropyl titanate.

14. A composition of matter as defined in claim 3 wherein said olefinic polymer is an alkylene-alkyl acrylate copolymer.

15. A water-curable, silane modified polymer of a chlorosulfonated olefinic polymer and a silane defined in claim 1.

16. A water-curable, silane modified polymer as defined in claim 15 containing about 0.5 to about 10 percent by weight sulfur, based on the weight of the chlorosulfonated olefinic polymer.

17. A water-curable, silane modified polymer of a chlorosulfonated olefinic polymer and a silane having the formula:

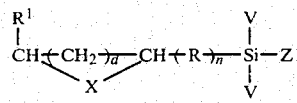

wherein X is oxygen, sulfur or nitrogen, R is a hydrocarbon radical or an oxy substituted hydrocarbon radical, each V is hydrogen, a hydrocarbon radical or a hydrolyzable group, Z is a hydrolyzable group, n is an integer having a value of one to 18, d is an integer having a value of zero or one and $R^1$ is hydrogen or a hydrocarbon radical.

18. A water-curable, silane modified polymer as defined in claim 17 wherein X is oxygen, d is zero and $R^1$ is hydrogen.

19. A water-curable, silane modified polymer as defined in claim 17 wherein X is sulfur, d is zero and $R^1$ is hydrogen.

20. A water-curable, silane modified polymer as defined in claim 17 wherein X is nitrogen, d is zero and $R^1$ is hydrogen.

21. A water-curable, silane modified polymer as defined in claim 17 wherein d is zero.

22. A water-curable, silane modified polymer as defined in claim 17 wherein the olefinic polymer is a polymer of ethylene and at least one $C_3$ to $C_8$ alpha olefin.

23. A water-curable, silane modified polymer as defined in claim 17 wherein, with respect to the silane, d is zero, R is alkylene, each V and Z are alkoxy, X is oxygen and $R^1$ is hydrogen.

24. A water-curable, silane modified polymer of chlorosulfonated polyethylene and γ-(1,2-epoxyethane)-propyltrimethoxy silane.

25. A process of preparing a water-curable, silane modified chlorosulfonated olefinic polymer which comprises reacting a mixture containing a chlorosulfonated olefinic polymer and a silane having the formula:

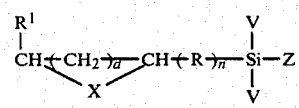

wherein X is oxygen, sulfur or nitrogen, R is a hydrocarbon radical or an oxy substituted hydrocarbon radical, each V is hydrogen, a hydrocarbon radical or a hydrolyzable group, Z is a hydrolyzable group, n is an integer having a value of one to 18, d is an integer having a value of zero or one and $R^1$ is hydrogen or a hydrocarbon radical.

26. A process as defined in claim 25 wherein said mixture contains an organo titanate.

27. A process as defined in claim 26 wherein said organo titanate is present in an amount of about 0.1 to about 20 percent by weight and said silane is present in an amount of about 0.1 to about 50 percent by weight, based on the weight of a chlorosulfonated polymer containing about 0.5 to about 10 percent by weight sulfur.

28. A process as defined in claim 27 wherein said organo titanate is present in an amount of about 0.5 to about 10 percent by weight and said silane is present in an amount of about 0.5 to about 10 percent by weight, based on the weight of said chlorosulfonated olefinic polymer.

29. A process as defined in claim 26 wherein said olefinic polymer is chlorosulfonated polyethylene, said silane is γ-(1,2-epoxyethane)propyltrimethoxy silane and said organo titanate is tetraisopropyl titanate.

30. A composition as defined in claim 3 wherein $R^1$ is hydrogen, an alkyl having a maximum of 4 carbon atoms or phenyl.

31. A water-curable, silane modified polymer as defined in claim 17 wherein $R^1$ is hydrogen, an alkyl having a maximum of 4 carbon atoms or phenyl.

32. A water-curable, silane modified polymer as defined in claim 17 wherein said olefinic polymer is an alkylene-alkyl acrylate copolymer.

33. The cured product of the polymer defined in claim 15.

34. A wire or cable covered by the polymer of or cured polymer of claim 15.

* * * * *

UNITED STATES PATENT AND TRADEMARK OFFICE
CERTIFICATE OF CORRECTION

PATENT NO. : 4,493,924
DATED : Jan. 15, 1985
INVENTOR(S) : Mahmoud R. Rifi

It is certified that error appears in the above-identified patent and that said Letters Patent is hereby corrected as shown below:

Column 1, line 27, "(e) use" should read -- (e) excellent use --

Column 2, line 26, "ae" should read -- are --

Column 3, line 47, "1,2-epoxy" should read -- 1,3-epoxy --

Column 3, line 59, "II" should read -- Formula II --

Column 3, last line, "III" should read -- Formula III --

Column 5, line 18, "V" should read -- Formula V --

Signed and Sealed this

Twenty-eighth Day of May 1985

[SEAL]

Attest:

DONALD J. QUIGG

Attesting Officer

Acting Commissioner of Patents and Trademarks